ARTICLE DECORATION APPARATUS AND METHOD

Original Filed Dec. 29, 1964 2 Sheets-Sheet 1

INVENTOR.

JEROME H. LEMELSON

ARTICLE DECORATION APPARATUS AND METHOD

Original Filed Dec. 29, 1964 2 Sheets-Sheet 2

INVENTOR.
JEROME H. LEMELSON

United States Patent Office

Re. 28,068
Reissued July 9, 1974

28,068
ARTICLE DECORATION APPARATUS AND METHOD

Jerome H. Lemelson, 85 Rector St., Metuchen, N.J. 08840

Original No. 3,504,063, dated Mar. 31, 1970, Ser. No. 421,897, Dec. 29, 1964, which is a continuation-in-part of application Ser. No. 734,340, May 9, 1958, now Patent No. 3,173,175. Application for reissue Feb. 3, 1972, Ser. No. 223,287

Int. Cl. B29c *9/00*; B29f *5/00*

U.S. Cl. 264—24 20 Claims

Matter enclosed in heavy brackets [ ] appears in the original patent but forms no part of this reissue specification; matter printed in italics indicates the additions made by reissue.

ABSTRACT OF THE DISCLOSURE

The provision of an apparatus and method for selectively depositing a particulate material against one or more selected areas of the surface of a mold, retaining said material against the areas on which it is deposited, and solidifying the deposited material either prior to or immediately after disposing a molding material in the mold in a manner to fuse the deposited material to the molding material so as to form a unitary and integral structure of the two.

*This application is a reissue of U.S. Pat. No. 3,504,063 issued on Mar. 31, 1970.*

This invention relates to molding apparatus and is a continuation-in-part or my copending application Ser. No. 734,340 filed May 9, 1958, now Patent No. 3,173,175 issued on Mar. 16, 1965. In particular, this invention is concerned with a method and apparatus for molding and decorating articles in the same mold in which they are formed.

In the manufacture of articles by molding or casting molten material in a mold or die, it is frequently required to decorate or label the article to finish same. Conventional means for decorating molded articles include coating predetermined areas with decorative material by applying said material through openings in masks, or applying same by roller printing or silk screening means. These methods involve a plurality of separate manufacturing operations and require that the article be removed from the mold, placed on a fixture and/or conveyed in such a manner to preposition it with respect to a mask, printing, spraying or screening equipment, and, in certain instances, equipment operative to prepare the surface thereof for decorating.

Equipment required to decorate molded articles is relatively complex and high in cost. Spray decorating requires the constant positioning, changing and cleaning of masks, and the like and is generally a manual or semi-automatic operation requiring that the articles to be decorated be manually loaded on a conveyor or turntable and that the proper mask be positioned between the article and spray gun. Simple silk screening decorating equipment is manually operative and requires positioning the articles to be decorated on a fixture which is moved relative to a printing device or the latter is rolled thereagainst. Automatic screening equipment is not easily changed or altered to accommodate different sizes and shapes and, hence, is generally used only for the decoration of bottles and the like of regular shape requiring large production runs. Odd shaped articles are not easily decorated by screen or spray means operative to apply liquid decorating inks, enamels or plastics.

Accordingly, it is a primary object of this invention to provide a new and improved apparatus and method for molding, and decorating articles of manufacture.

Another object is to provide an apparatus and method for shaping articles of manufacture in a mold or die and decorating said articles during the shaping operation so as to eliminate the need to rehandle the article thereafter in the act of decorating same.

Another object is to provide a new and improved apparatus for forming composite articles by selectively depositing a first material in a mold and molding a second material in situ against said first material so as to form an integral molding therewith made of both materials.

Another object is to provide an improved apparatus for coating selective areas of the walls of a mold cavity with material, operative to become part of an article formed to shape in said mold.

Another object is to provide an apparatus for selectively depositing surface coating material on a mold wall by electrostatic means.

Another object is to provide an improved electrostatic surface decorating apparatus including means for rapidly charging a photo-conducting surface, means for selectively discharging areas of said surface and means for disposing particulate surface decorating material onto selected charged areas of said material, all operative simultaneously or in rapid sequential succession.

Another object is to provide means for forming molded articles with portions of the surface thereof defined by abrasive particles.

Another object is to provide improved structures in molds and mold inserts applicable for decorating articles.

Another object is to provide new and improved structures in molds operative to receive plural materials.

Another object is to provide improved structures in printing plates, masks and methods for utilizing same to decorate irregular surfaces therewith.

Another object is to provide a new printing method applicable for decorating irregular surfaces.

Another object is to provide an improved method and apparatus for coating molds with substantially the required quantity of mold release material and maintaining said condition throughout many molding cycles.

Another object is to provide apparatus and methods for selectively coating various articles formed in dies such as stampings and forgings by coating the walls of said dies prior to engagement with said articles.

Another object is to provide an apparatus and method for selectively coating surfaces of articles formed from sheet material during the process of stamping or pressure deforming sheet material to form said articles.

Another object is to provide improved means for spraying decorative and surface conditioning materials through a mask in a manner whereby a minimum amount of spraying material is deposited on the mask.

Another object is to provide apparatus and methods for selectively coating or decorating articles wherein magnetic forces are employed to effect same.

Another object is to provide a method of decorating and printing by selectively depositing thermoplastic particles onto predetermined areas of a surface, rendering same semi-molten thereon and transferring the semimolten indicia to another surface to which it becomes bonded upon solidifying.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 1:
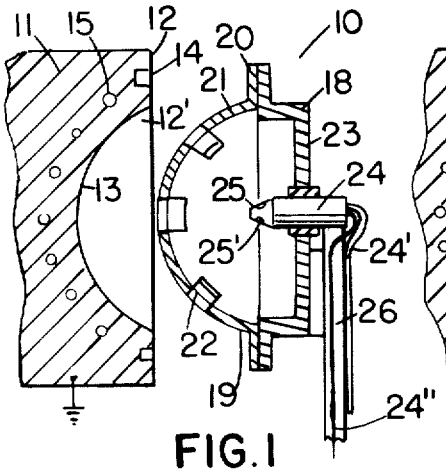
FIG. 1 is a side cross-sectional view of a portion of a molding apparatus including a mold member having a cavity in which material is molded to shape and auxiliary apparatus operative to deposit a material onto selected areas of the wall of the mold cavity which material coats or eventually defines a portion of the article molded therein.

This invention is concerned with molding articles having composite surface structures produced by selectively depositing one or more materials against a predetermined area or areas of the surface of the wall of a mold cavity which is shaped to define the shape of the article molded therein. After such selective deposition, which is preferably effected by electrostatic means, molding material is injected, poured, compressed, blown or otherwise caused to enter the mold cavity and about the wall thereof and combine with the deposited material which becomes an integral part of the material being molded, preferably defining at least a portion of the surface of the article molded in the cavity. While the apparatus and method are primarily intended for use with polymeric materials such as thermoplastic resins, other materials may also be utilized as the molding and decorating materials such as metals, ceramics, glass, non-metallics or the like in combination with each other or said polymeric materials.

Molding techniques applicable to this invention in addition to injection molding which will be described, include compression molding, slush or rotational molding, pour molding, compacting such as prior to sintering, spray molding and the like.

The process involves the steps of (a) selectively depositing a first material in the form of fine droplets or particulate solid material onto selected and predetermined areas of the surface of the wall of a mold cavity; (b) molding a material in said cavity which material is in such a state prior to or during molding by virtue of its molten or semi-molten condition that it forms an integral bond with the first material deposited on the surface of the mold cavity wall. Depending on the materials employed and the molding procedure, the first material may, prior to introducing the molding material thereagainst, remain in the state, liquid or powder, in which it is initially deposited or may be further processed prior to molding thereagainst. For example, if said first material is a thermoplastic applied in particulate or powder form, heat applied through the mold wall or by radiant or other means may be utilized to cause the particles to melt into a unitary mass prior to molding. Such mass or coating may remain semi-molten during moulding or may be caused to solidify just prior to molding depending on the materials employed and the parameters of the molding procedure.

In a preferred form of the invention, both the molding and decorating materials comprise thermoplastic resins such as polyethylene, polypropylene, polyamide, polyvinyl-chloride, acetate, styrene or the like with the decorating material selectively applied to predetermined areas of the mold wall be spraying or dusting with charged powder particles of the same or different resins which are attracted to areas of the mold wall which areas have been rendered of opposite electrostatic charge to that of the particles. The procedure is continued for a predetermined time interval until a desired amount of material has been deposited or desired thickness of coating has formed, after which the molding material is introduced against the surface of the mold cavity wall and caused to combine with the applied material by fusion therewith.

Other materials which may be applied to the selected areas of the surface of the mold include powdered metal, ceramic, glass, thermosetting resins, carbon, etc. or any of these materials in other forms such as droplets, fibers, chips or the like which may be selectively deposited by electrostatic means. The molding materials may be molten, semi-molten, powder or other forms of the above materials which are poured, injected, compacted, blown or otherwise introduced into the mold cavity. A predetermined quantity of the same or different materials may be flowed by gravity, dusted or brush applied, inertially projected, carried on a stream of another fluid such as air or otherwise dispensed to flow against the wall of the mold cavity and caused to deposit onto selected areas thereof by electrostatic or magnetic attraction means or masking means. If carried on an air stream or other fluid dispensed from a nozzle, they may be charged or magnetized in the gun or nozzle from which they are ejected against the mold wall for the selective deposition thereof as will be hereinafter described. They may also be rendered molten or semi-molten in the nozzle or gun to provide same as a continuous coating on the said selected area or areas of the mold wall which wall may be cooled by heat transfer fluid flowing therethrough to rapidly solidify the coating material and the molding material disposed thereagainst thereafter.

The process may also be applicable to the selective coating or decorating of articles which are stamped or otherwise formed in a die or pressure forming mold operative to form sheet material if the coating material is either provided in a molten state when applied or rendered molten or semi-molten in the die just prior to forming a sheet therein.

The process and apparatus described hereafter may also be utilized for selectively coating or plating the wall of molds and other irregularly shaped articles with materials operative to improve the operation thereof, or in certain instances such as the fabrication of electrical circuits or electrical devices, to provide insulating and/or conducting portions hereof.

There is shown in FIG. 1 an apparatus 10 including a mold or die member 11 and an assembly 18 which is operative to apply material to selected areas of the surface 13 of the wall 12 of a mold cavity 12' defined at least in part by mold member 11. Member 11 may be utilized per se or in combination with one or more further mold or die members operative to shape a material by casting, injecting or otherwise disposing said material in the mold cavity against the surface 13. Prior to disposing said material against surface 13, in accordance with the teachings of this invention, one or more selected areas of the cavity wall are coated or otherwise covered with a material which will eventually define a portion of the surface of the article shaped in the cavity 12'.

Assembly 18 includes an elongated support member 26 which is secured to a frame or flanged retainer 23 having a mask 19 which is shaped to conform to at least part of the surface 13 of the wall 12 of the cavity 12' in member 11 and has a plurality of openings 22 in a shell-like portion 21 thereof extending from a flange 20 secured to the flange of member 23. In other words, members 19 and 23 define a hollow enclosure having a wall portion operative to engage and serve as a mask for the surface 13 upon being moved thereagainst or abutted by movement of member 11.

Centrally disposed within frame or housing member 23 is a nozzle assembly 24 having a tip 25 with one or more openings 25' therein from which streams of material in particulate, droplet or atomized form may be directed through the opening 22 in wall 21 of the mask 19 to be disposed against surface 13. Such material may be fed under pressure per se or on a carrier stream of fluid such as air through a tube or conduit 24' held by support member 26 to the nozzle 24 upon alignment of assembly 18 with 11 and engagement of the outer surface of the mask 19 with the proper portion of the surface 13 of mold 11.

The mold wall deposition apparatus of FIG. 1 is subject to a number of variations in structure and mode of operation. In its simplest form, the shell-like mask or stencil 21 may be molded of sheet material with its outer surface adapted to conform to the shape of the wall 13 of the mold cavity 12' in the face or wall 12 of the mold. Upon engagement of the outer surface of mask 19 and the surface of wall 13, material may be directed as one or more streams of powder or atomized liquid through the opening or openings in the mask and become disposed in the shape of the opening against a predetermined area of the cavity wall. After a predetermined quantity of such material has been so deposited, automatic control means such as a cycle controller may be operative to terminate the flow of such material by closing a valve or deenergizing a pumping means after which said control means is operative to effect retraction of the mask and spray assembly from the mold cavity and/or movement of the mold member 11 to separate the two so that mold ing may be effected thereafter. With such an arrangement, it will be necessary to wipe or otherwise remove sprayed material from the mask 19 periodically if not during each cycle so as to prevent such material from running along the outside surface 21 of the mask and become deposited on the mold cavity wall 13 and to prevent clogging of the openings 22 in the mask. Such cleaning operation may be effected by automatic means such as operative to immerse it in a solvent while molding is in process.

Electrostatic forces may be employed in order to reduce contamination of the mask and assure that a larger percentage of the sprayed material is actually deposited on the selected area or areas of the mold cavity wall surface. A number of techniques may be employed as hereinafter presented. In a first method, the mold or an insulated liner therefore defining the wall of the cavity 12' as hereinafter provided, may be electrically charged to a first polarity and the sprayed particulate material or atomized droplets charged in the gun to a second polarity. If the mask 19 is uncharged and non-conducting or insulating to the charge on the surface of the mold cavity wall so that the finely divided spray particles are only affected by and attracted to the surface or surfaces of the mold cavity wall exposed through the openings in the mask. Thus substantially all of the particles will flow through the mask or stencil openings and deposit on the mold wall surfaces exposed therethrough. The spray nozzle 24 and its related feed and charging apparatus may comprise apparatus manufactured by Shames, Incorporated of Palisades Park, New Jersey under the trade name, Stajet which is defined as electrostatic dry powder spraying. If thermoplastic powder is so deposited, it may be melted to form a contiguous coating on the surface area or areas defined by the openings 22 in the mask by heat applied to the mold wall from either the previous charge molded therein or by means of heat transfer fluid flowed through passageways 15' in the mold wall adjacent the surface 13 of the cavity. A high voltage, low amperage charge on such particles is applied in the nozzle being of the order of 100 KV potential and continuous flow is effected until terminated under mild air pressure of .3 to 1.5 pounds per square inch.

In a second method, the mask 19 or a coating thereon, may be charged to a potential opposite to that at which the particles or droplets are charged so as to effect repulsion and said particles therefrom and effect their direction through the openings 22 therein. If sprays of particulate material are directed in the general vicinity of the openings 22 in the mask and are controlled in their flow path as well as duration, then those particles which would ordinarily impinge on the uncharged mask, will be repelled therefrom and directed through the openings therein. Variations in this method include constructing the mask with conductive coatings or metal members which are selectively positioned around or adjacent to the openings in the mask and are adapted to be electrically charged to repel oppositely charged particles or droplets therefrom so as to permit flow of said particles through the mask openings and deposition thereof onto the areas of the mold cavity wall exposed through said openings. Connection of the mask conductors or coatings with a source of the proper potential may be effected through wires extending along the support 26 to the source of potential through a control or switch which is operative by the same electrical control means controlling the other molding variables. While it may not be necessary to charge the mold member 11 to attract sprayed particles thereto through the mask openings, such means may be operative to improve the selective mold coating operation.

In a third method, a fine electro-conductive metal screen is disposed in the mask openings 22 and is charged so as to charge the particulate material flowed therethrough from the spray gun or other means. The mold or cavity wall liner therefore is oppositely charged so as to attract the particles passing through the screen. The particles are thereafter fixed or melted and solidified as described prior to the admission of the molding material to the mold. The entire stencil 19 may be made of such electro-conductive metal screen which is shaped to the contour of the mold cavity wall and is internally supported and secured to member 18. Disposing a shell or non-conductive coating along the inside surface of the screen mask along those areas aligned with portions of the mold cavity wall which are not to receive coating material will serve to render the screen a stencil-like structure in which non-coated or covered areas thereof define openings through which particulate material may flow to the surface of the mold cavity wall.

In mask constructions involving such a fine, electroconductive metal screen, the screen may be embedded within the wall of the stencil or mask 19 or bonded to the front or ream surface thereof. If bonded to the front surface of 19, the mask may be positioned away from the surface of the mold wall so as to prevent shorting. If supported within or behind the mask base 19, the screen will be insulated thereby from the mold wall and if 19 is non-conducting, its front face may engage the face of the charged mold cavity wall or a liner therefore.

Electrostatic atomizing equipment applicable to the mold coating apparatus of FIG. 1 may comprise a centrifugal atomizer such as the model FR manufactured by Ionic Electrostatic Corporation of Garfield, N.J.

Particulate solid materials may be applied to the surface of the mold cavity wall by means other than spraying such as gravity flow or brush means disposed adjacent the mask or within the assembly 18 and operative to provide a steady flow of particles against the mold wall through openings in the mask or against selectively charged portions of the mold wall adapted to electrically retain particles agains the areas so charged. Means as described hereafter such as photoconductive mold coating means may be employed to selectively charge predetermined areas of the mold wall to retain opposite charged particles thereagainst. Or the mold wall may be constructed with portions thereof which define the surface of the cavity 12' being chargeable while adjacent portions are not so chargeable for attracting sprayed or otherwise flowed particles of coating material when electrically energized or charged.

Figure 2:
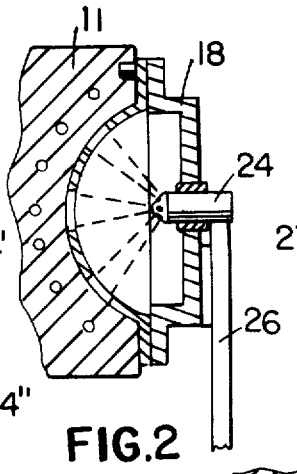
FIG. 2 is a side cross-sectional view of the apparatus in FIG. 1 in operative relationship in the act of selectively coating the mold wall.

FIG. 2 illustrates assembly 18 in working relationship with member 11 whereby material may be sprayed from nozzle 24 through the openings 22 in mask member 19 so as to coat selected areas of 13. Such positioning is preferably effected after the mold 11 has been conditioned and positioned for the coating operation by the controlled movement of either or both member 11 and assembly 23. Upon attaining the mating relationship between the assembly and mold member 11 as illustrated in FIG. 2, a predetermined quantity of material is flowed through the inlet to the nozzle 24 and is ejected through one or more holes in the nozzle tip portion 25 through the opening or openings in the mask until a coating or covering of predetermined depth has been applied to the surface of the mold.

Figure 3:
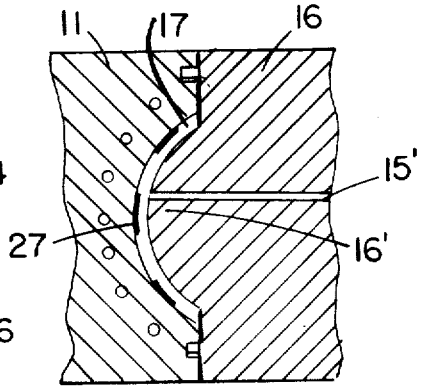
FIG. 3 is a side cross-sectional view of the mold member of FIG. 1 assembled with a second mold member to define a molding cavity after processing the wall of the mold cavity by the means illustrated in FIGS. 1 and 2.

In FIG. 3, the assembly 24 has been removed from the vicinity of the mold member 11 and a second mold member 16 is shown assembled with 11 to define a molding cavity 17 into which molding material such as a polymer, ceramic or metal may be flowed through an opening or inlet 15 shown in mold member 16. Notation 27 refers to the material disposed against the surface 13 of mold member 11 by the means described which defines a portion of the outer surface of the molded member 28 shown in FIG. 4. Depending on the characteristics of both the molding material and the material 27 applied to portions of the surface 13, retention of said material against the molded article may be effected by mechanical means resulting from molding in situ thereagainst or bonding or welding means resulting from fusion of the molding material and the spray applied material 27.

Other features of the apparatus illustrated in FIGS. 1–3 include the provision of a plurality of passageways 15' in the mold section 11 through which heat transfer material may be flowed to perform one or more of a plurality of functions. For example, if the material ejected from nozzle 24 and directed through the openings 22 of the mask 19 is a particulate thermoplastic polymer, it may be desirable to melt said material in situ on the surface of the mold and solidify same into one or more formations which are temporarily bonded to the mold wall until molding occurs whereafter they also become bonded to the molding material and are removable therewith upon removal of the molded article from the mold. In such an arrangement, if the material is not sprayed from the nozzle in a molten or semi-molten condition, it may be desirable to pass a hot fluid or liquid through the passageways 15 to heat the wall of the mold to cause the melting of the applied particulate material. Such heating may also be desirable to cure a thermosetting resin applied in particulate or droplet form to the surface 13 through the openings in the mask prior to molding. In order to hasten solidification of the molding material in the mold cavity, it may also be desirable to pass a coolant or heat transfer fluid through passageways 15 disposed adjacent to cavity and operative to rapidly remove heat from the mold wall. Or, if a thermosetting resin is applied in particulate or fluid state to the mold cavity during molding, it will be desirable to heat the wall of the mold to cause same to set by passing a heated fluid through the passageways 15 in the mold wall. Although not illustrated, the mold member 16 of FIG. 3 may also contain heat transfer fluid passageways connected as are the passageways 15 of mold member 11 to a source of heat transfer fluid through a control means therefor such as a valve which may be cyclically controlled by means of interlock switches or a programming means operative to control the other molding variables which have been described or will be described hereafter.

In another form of the invention, if mold member 11 is metal, the mask 19 may be insulated therefrom by a coating of insulating material disposed against the outer surface of portion 21 thereof while the remainder of the mask may be made of metal which is charged to a first potential. If the nozzle 24 contains means for charging the material ejected therefrom to a polarity which is similar to that charging the mask, then the streams of particulate or droplet material will be repelled from the mask but will be allowed to pass through the openings therein so that the mask itself will not become interiorly coated and substantially all of the coating material will become disposed against the selected areas of the wall of the mold defined by the openings in the mask. A suitable mask design may comprise one in which metal sheet which charge to the polarity of the coating material is disposed behind the face of a mask shell made of insulating material and is so contoured as to provide the proper flow of coating material when charged to a predetermined potential. Generally, it is desirable to charge the mask to a potential of from 100 to 800 volts either positive or negative polarity with a similar polarity rendered on the particles or droplets sprayed from nozzle 24 by passing same between electrodes or over a drum of higher potential charge.

If the material ejected from nozzle 24 is in particulate form, it may remain so just prior to molding and even after molding depending on the composition of the composite article to be produced. Particles of ceramic or metal may be made part of the molded article by mechanical retention thereagainst when the molding material encapsulates at least a portion, if not all, of said particles or may melt upon flowing the molding material into the cavity by means of heat transferred thereto from said molding material. Furthermore, it is noted that the mold member 11 may have retained sufficient heat from the prior molding cycle to melt and fuse the particulate or droplet material disposed thereagainst as described so as to form one or more solid or semi-molten coatings on the surface of the mold.

Figure 4:
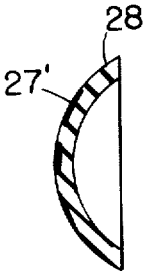
FIG. 4 is a side cross-sectional view of an article molded in the apparatus of FIG. 3.
Figure 5:
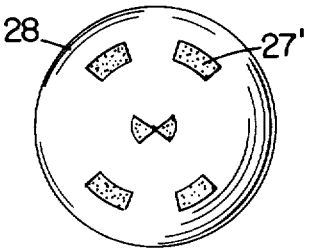
FIG. 5 is a front view of the article of FIG. 4.

FIGS. 4 and 5 illustrate the molded article 28 containing selected areas 27' thereof coated or inlayed with coating material as described which may be used for decorative or other purposes. If the molding material is a thermoplastic polymer of a first color, the material applied to the wall of the mold may comprise the same or a different polymer of a second color operative to decorate same. The material applied to the wall of the mold through the mask may serve other functions than merely to decorate the surface of the molded article. For example, it may be made of a polymer or other material having a higher or lower lustre, frictional characteristic, rigidity, strength, lubricity or other characteristic than the molding material. For example, conducting, non-conducting and semi-conducting material may be applied to surfaces of molded articles by the means described as may electrical circuit components and the like.

The apparatus of FIGS. 1 and 2 may also be operative for forming articles of manufacture with surface decorations by means other than molding. For example, member 11 may comprise part of a stamping die assembly operative to receive sheet or other material which is deformed into the cavity 12 and is compressed against the material coated thereagainst as described whereby, when the stamping is removed from the cavities, said decorative or coating material will be retained against the die stamped article. Such retention may be effected by providing the deformed sheet of a material having a greater affinity for the material coated against the wall 13 than the material comprising said wall or by heating, coating or otherwise processing the sheet material so as to retain the material temporarily retained against surface 13.

Regardless of the process utilized to form the composite article, for certain coating and molding materials it may be desirable to provide the surface 13 of the mold cavity 12' of a material which will release the coating material 27 to the article formed thereagainst and said surface may be part of a coating or liner disposed against the mold such as polytetrafluoroethylene or the like. The surface 13 may also have a lubricant applied thereto prior to application of the coating material 27. Such lubricants as graphite film, silicone materials and the like may be automatically sprayed, applied by glow discharge means or other means against the surface of the mold cavity prior to applying material 27 thereagainst. The electrical glow discharge electrode as well as means for expelling the desired vapor to be deposited against the mold wall may be mounted within the housing defined by notation 24 or insulatedly supported off housing member 18. A monomer discharged as a vapor from the spray nozzle 24 may be directed as described against predetermined areas of the mold wall and polymerized in situ thereon by the action of the glow discharge means. The glow discharge means may also include an electrode defined by mask member 21 or secured thereto and of such a potential as to polymerize the monomer vapors or particles deposited on the mold wall as or shortly after deposition.

In the hereinbefore described molding and decorating procedures, one or more articles may be secured to the surface of the mold cavity wall prior to or after application of the spray deposited coating material to form composite articles made of the molding material, the deposited material and said secured articles. Accordingly deposition as described may be effected on either or both the articles and the mold wall prior to molding.

Figure 6:
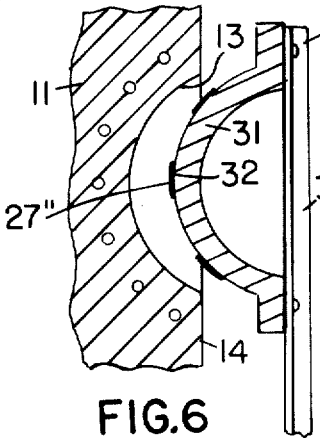
FIG. 6 is a side cross-sectional view of a modified form of the apparatus of FIG. 1 in which coating material is transferred to the wall of the mold cavity by means operative to preposition and engage the surface of the mold cavity.

FIG. 6 illustrates the molding apparatus of FIG. 1 having decoration means 30 therefor operative to provide material against the surface 13 of the mold cavity wall for the purposes described by means of transfer of said material from a form 31 having its outer surface 32 conforming to the mold wall when in operative relation therewith. The form or transfer device 31 is supported by an arm or frame 33 which is movable from a position in which it clears the mold sections so as to permit closure of the mold to a position directly in line with the mold cavity 12 after which either the mold member 11 moves to engage or move closely adjacent the surface 32 of 31 or the means supporting 33 is operative to move the printing form into engagement with the surface of the mold cavity so as to effect transfer of one or more coatings or articles 27'' disposed against surface 32. The material 27'' may be attracted to surface 13 upon engagement therewith as a result of the partial or complete transfer of said material by adhesion thereagainst. If the material 27 and/or the mold member 11 are provided with an electrical charge or charges operative to attract and retain said material against the surface of the mold cavity wall, then such means may be provided to effect transfer of all or part of said material. The apparatus of FIG. 6 preferably includes automatic means for replenishing the one or more coatings or articles 27'' to be transferred from the surface 32 to the mold wall while the mold is being utilized for molding purposes and such operation is preferably completed prior to completion of the molding operation so that the transfer member 31 may be immediately projected or rotated into position in alignment with the mold cavity. The material 27'' disposed against the face 32 of transfer form 31 may comprise preshaped inserts of metal, plastic or ceramic fed into position and bonded or otherwise retained against surface 32 by automatic assembly means. It may also comprise coating material sprayed, screened, rolled or otherwise disposed against selected areas of surface 32 by automatic means operative during the molding cycle and preferably controlled by a single programming means which also controls the other molding variables so as to synchronize the molding and decoration operations.

Figure 7:
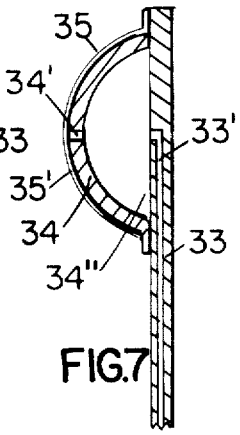
FIG. 7 is a side view of a modified type of mold coating apparatus.

FIG. 7 illustrates a modified form of the invention which includes a support 33 for a form 34, the outer surface of which is shaped to substantially conform to the surface 13 of the mold cavity wall. Disposed against the outer surface 34' of 34 is a sheet 35 of decorative material such as printed flexible plastic film or thermally deformed rigid plastic sheet. Either or both surfaces of the sheet or film 35 are preferably decorated by printing which decorative printing becomes part of the molded article when 35 is disposed against the surface 13 of the mold cavity by movement of either the mold or the assembly supporting 35 to cause engagement of 35 against the mold cavity wall. Securing of member 35 to the mold cavity wall may be effected by bonding thereagainst resulting from temporarily heat sealing 5 thereto or by electrostatic means in which either or both the mold and film 35 are statically charged so as to effect attraction and retention of 35 against the cavity wall upon engagement therewith permitting removal of the form 34 from the vicinity of the mold cavity and its retraction so as to clear the mold to permit the closure thereof and effect a molding cycle in which material is molded directly against sheet 35 disposed against the surface of the mold cavity wall.

Apparatus associated with the transfer means illustrated in FIG. 7 preferably includes means for automatically disposing new sheet material 35 against the outer surface of form 34 while the molding operation is in progress, such means preferably being automatic. This may include means for prepositioning thin, preprinted or otherwise decorated film over the form 34, draping and retaining same thereagainst by bonding or electrostatic means. If electrostatic means is utilized to retain decorated plastic film against surface 34', it is preferably of a lower order of attraction than the charge disposed along the surface of the cavity of mold 11 so that the film will transfer thereto without difficulty.

In another form of the invention illustrated in FIG. 7, a printed or otherwise decorated sheet of thermally deformable plastic film is either shaped to the contour of surface 34' by conventional vacuum or pressure forming means or is thermaly deformed in situ thereagainst while molding occurs.

In still another form of the invention, means may be provided for clampingly engaging a sheet of decorated, thermally deformable plastic against the face 14 of mold member 11, heating said sheet to a semi-molten condition and applying pressure to the outer surface thereof or a die to cause same to enter the cavity and to conform to the surface 13 of the cavity wall. By die cutting said sheet against either surface 13 or 14 and retaining it in position against surface 13, it may be utilized to form an integral portion of the article shaped when molding material is injected into a mold cavity thereafter and solidified in situ thereagainst.

Notation 33' in FIG. 7 refers to an air line extending through member 33 to an opening therein extending to the interior of shell or from 34. One or more holes 34' in member 24 permit pressurizing the internal volume 34'' to cause sheet 35 to be formed off shell 34. If vacuum is applied to volume 34 through line 33' it may be used to vacuum form the decorated thermoplastic sheet in situ against the surface of shell 34 to conform thereto so that sheet 35 of preshaped decorative material such as printed wall.

In other words, the apparatus of FIG. 7 may be operative in a plurality of modes to provide a form or sheet of decorative material against the surface of the mold wall cavity to become an integral part of the article molded thereafter in the mold. In a first mold of operation, a sheet 35 of preshaped decorative material such as printed or otherwise decorated transparent, translucent or colored plastic having decorations provided on its outer surface 35', is prepositioned on the form 35 while the form is retracted from the mold and preferably during the previous cycle of a molding and is held thereagainst by suction applied through line 33'. After the mold has been opened and the previously molded article removed therefrom, member 33 is automatically moved to position sheet 35 against the surface of the mold cavity wall. Positive air pressure and/or electro-static forces are thereafter used to remove member 35 from the surface of shell 34 and retain it against the surface of the mold cavity wall. Pressure applied through line 33' or the release of vacuum therefrom with sheet member 35 and/or the mold itself being electrostatically charged, may be utilized to secure sheet 35 to the mold wall.

In a second mode of operation, a decorated sheet of plastic or other material such as metal, is deformed against the outer surface 35' of shell 35 by vacuum, pressure or die means and made to conform thereto while the shell is retracted from the mold and during the molding part of the cycle. Thereafter the shell 34 is positioned in alignment with the mold cavity and projected therein so as to engage sheet 35 against the irregularly shaped wall of the mold cavity. Transfer and retention of the deformed sheet to conform to the surface of the mold cavity wall is next effected as described.

Figure 8:
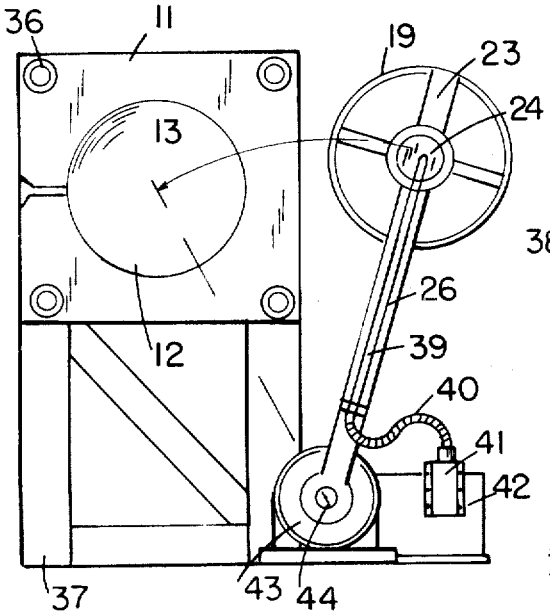
FIG. 8 is an end view showing further details of apparatus for selectively coating areas of a mold cavity wall.

FIG. 8 illustrates part of a molding apparatus including mold wall decoration means of the type described which is pivotally movable into alignment with the cavity of a mold section 11 of a multiple part mold, the other part of which is not illustrated but is closeable against the face of part 11 when the surface decorating means illustrated has cleared the side of the mold.

The mold section 11 is shown movable longitudinally along a plurality of parallel cylindrical guide rods 36 which are supported on a frame secured to the mount 37 for the molding apparatus. The lineal actuator such as a hydraulic cylinder (not shown) is connected to mold section 11 and moves same longitudinally along rods 36 in the act of opening and closing said mold section against, for example, mold section 16 shown in FIG. 3 for defining a molding cavity therewith. When retracted therefrom, the front face of mold section 11 clears a positioning device for the mold mask 19 or the apparatus of FIG. 6 or 7 which is mounted on an arm 26 which is pivotally supported for rotation with a shaft 44 of an actuating device 43 shown mounted on the floor at the side of the mold base 37. Actuator device 43 may be of any suitable design and is operative to either locate the mask 19 and mount 23 for the spray nozzle from the position illustrated in FIG. 8 to a position directly in alignment with the mold cavity 12 so that either further movement of said mask as the result of lineal movement of shaft 44 and/or movement of the mold section 11 will bring the face of the mask into surface abutment with the surface 13 of the mold cavity. Notation 39 refers to a pipe or conduit extending along support 26 and connecting the spray nozzle 24 with means for pressurizing material to be sprayed through the openings in the mask. A section 40 of conduit 39 is flexible and connects the lower end of 39 with the output of a pump 41 disposed between a reservoir 42 containing material to be dispensed through nozzle 24. Operation of the apparatus of FIG. 8 is preferably automatic and synchronized so as to position the mask in alignment with the mold cavity, move the mold member 11 and/or shaft 44 to bring the two surfaces into abutment with each other, operate the pump 41 or a valve in such a manner as to dispense a predetermined quantity of coating material through the spray nozzle; flow heat transfer fluid through the passageways in the mold to affect material deposited on the surface of the mold cavity wall; retract the mold and/or mount for the mask and pivot the latter so as to clear the mold; move the mold member 11 so as to close against the other mold member to define a molding cavity; inject a predetermined quantity of molding material into the mold; cause flow of further heat transfer fluid to effect solidification of the molding material; opening the mold after said solidification and effect removal of the molded composite article from that portion of the mold against which it is retained prior to withdrawal or knockout. Such a cycle of operations may involve program control of various servomotors and valves under the control of a single, variable programming device such as a multicircuit timer.

Figure 9:
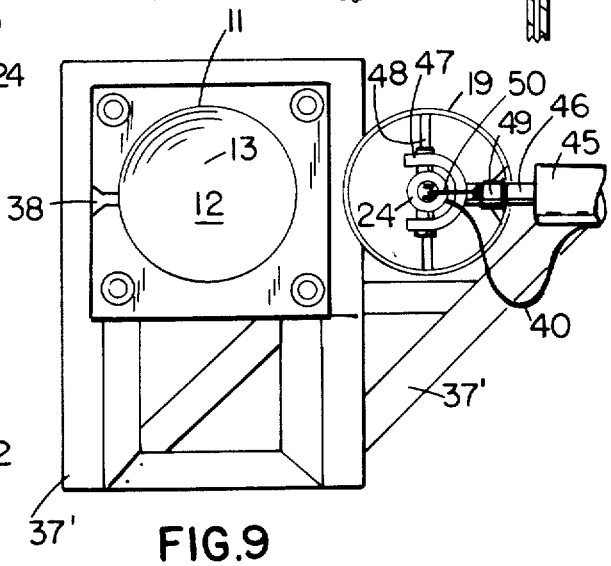
FIG. 9 is an end view of a modified form of apparatus of the type illustrated in FIG. 8.

FIG. 9 illustrates further modifications to the apparatus hereinbefore described which includes a lineal actuator 45 disposed on a mount 37' extending from the side of the mold frame or base 37 and operative to project a shaft 46 mounting the mask 19 or the devices of FIGS. 6 and 7 into alignment with the mold cavity 12. Thereafter, the servo means moving mold 11 is operated to bring the mold cavity into abutment with the aligned mask 19 and material is transferred from the dispensing device as described. In FIG. 9, the dispensing device includes a nozzle or other form of particulate or droplet forming and dispensing means 50 which is shown pivotally mounted in a yoke 47 and is pivoted therein by means of a small servomotor 49 secured to shaft 46 so as to permit directing of material ejected therefrom along one or more predetermined paths within the volume defined by the mask 19. Device 50 is supported on a shaft 48 which is rotatable in the yoke 47 and servo device 49 is preferably program controlled in its operation for certain mold decorating applications. However, in many applications, it may suffice to provide the design of the nozzle head or tip 25 with one or more openings therein which are so positioned as to direct one or a plurality of streams of liquid, particulate or droplet material along substantially predetermined paths so as to pass through the openings in the mask 19. Notation 40 refers to a flexible conduit of sufficient length to connect the nozzle 50 with a source of material to be sprayed and pressurizing means therefor when the shaft 46 is fully projected.

It is also noted that the yoke mount 50 for the nozzle 49 of FIG. 9 may be replaced by a gimbal amount therefor and a plurality of program controllable servo motors for positioning the nozzle to direct one or more sprays of coating material against respective areas of the mask.

Still another method and apparatus for selectively coating or depositing material against the surface of a mold cavity wall is illustrated in FIGS. 10 to 14 which employs xerographic techniques in which the mold itself is provided at a ground potential and a coating or liner of photoconducting material defines all or a portion of the wall of the molding cavity. A grid wire or electrode shaped to conform to the surface of the mold cavity wall is first used to uniformly charge the photoconductive liner, which charge is thereafter removed from selected areas by means of a light pattern as disclosed in Patent 2,955,-052.

Figures 10, 11, 12, 13, 14:
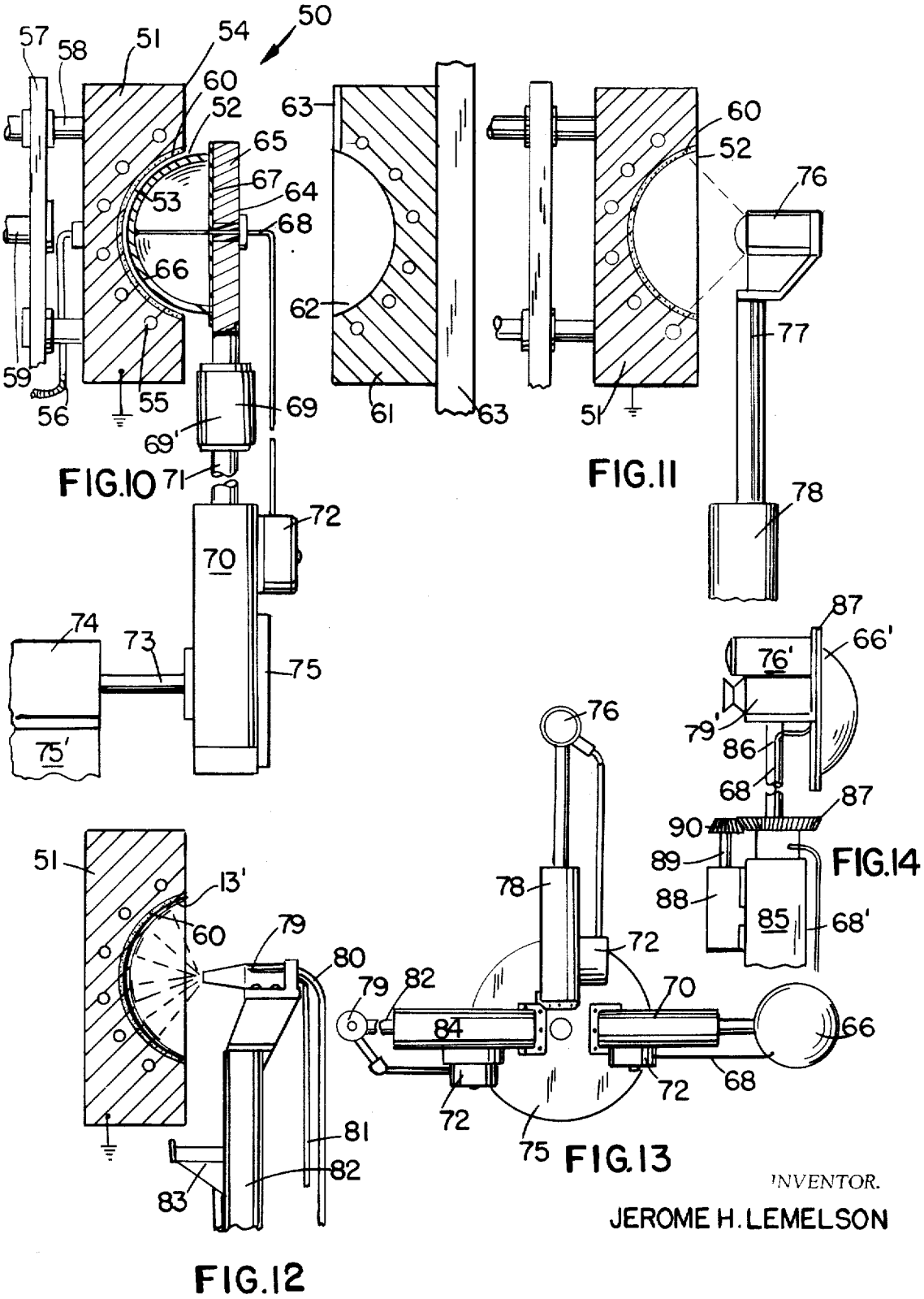
FIG. 10 is a side cross-sectional view of a molding apparatus and an apparatus operative to electrostatically charge the surface of the wall of the cavity of a mold.
FIG. 11 is a side cross-sectional view of apparatus operative to selectively discharge areas of the surface of the cavity wall of the mold of FIG. 1.
FIG. 12 is a side view of the mold of FIG. 11 and a further apparatus for depositing particulate or droplet material against selected areas of the wall as defined by the means of FIGS. 10 to 11.
FIG. 13 is an end view of an apparatus for prepositioning the surface charging, discharging and depositing means of FIGS. 10 to 12.
FIG. 14 is a side view of a modified form of apparatus operative to perform similar to that provided in FIGS. 10 to 12.

FIGS. 10–13 illustrate apparatus for selectively depositing material on the surface of a mold wall cavity by electrostatic deposition means in which particles or atomized droplets of the coating material are charged either negatively or positively and are attracted to oppositely charged areas of the surface of the mold. In FIG. 10, a mold section 51 has a molding cavity 52 which is either coated with or defined by a liner 60 made of a photoconductive insulating material such as vitreous selenium, selenium-tellurim mixtures, zinc oxide in a ceramic binder, or the like. The photoconductive insulating material is one which is able to retain, while unexposed to light, an electrostatic charge on its surface for a sufficiently long time interval to allow exposure and development or other utilization of a formed electrostatic charge pattern on its surface which, on exposure to activating radiation, rapidly dissipates charge. The surface 53 of the mold cavity wall, lining or coating thereof may be first uniformly charged by any suitable charging means prior to creating a charge pattern by means of light images projected thereagainst. In FIG. 10 the charging means comprises a fixture 64 which is operative to position an electrode 66 such as a corona discharge plate which is shaped to conform to the surface of the mold cavity and is positionable immediately adjacent thereto after the mold sections 51 and 61 are separated as illustrated. Shell-shaped electrode 66 is insulatedly supported off a base 65 by means of an insulating sheet member 67 and is charged by means of voltage in the order of 6,000 to 10,000 volts supplied thereto through a conductor 68 from a source of said potential. The base 65 is supported at the end of the shaft 71 of a lineal actuator 70 such as an air cylinder which is supported on a base 75 secured to the end of a second shaft 73 of a servo device 74 which is operative to rotate 64 thereon and to longitudinally move to position the electrode 66 within the cavity of the mold 51. By a combination of program controlled operation of the servo means (not shown) moving mold member 51 and/or the servo devices 74 and 70, electrode 66 may be brought into the immediate vicinity of the surface of the mold cavity as illustrated and energized to create a uniform charge pattern across said surface or the areas thereof coated or lined with photoconductive material. Corona discharge of electrical charge through the air gap between the outer surface of the electrode 66 and the surface of the mold cavity wall may be utilized to effect the charging of the latter or engagement of the electrode thereagainst may be employed to effect said charging.

Other features of the apparatus illustrated in FIG. 10 include the provision of a coupling means 69 disposed between base member 65 and the shaft 71 of lineal actuator 70 permitting removal of the electrode 66 therefrom and its replacement with electrodes of other shapes which may be utilized to charge molds having cavities of different shapes. One or more fasteners 69' may be provided as part of the coupling member 69 which may be loosened to remove the electrode assembly and tightened to fasten a new assembly thereon. For example, a single straight or bent corona discharge wire may be secured to an insulating member retained by the coupling 69 and will suffice for charging the surfaces of certain mold cavity walls without resort to an electrode of the complexity of that illustrated in FIG. 10 provided that it is properly positioned with respect to the mold by the means illustrated. Notation 72 refers to a self-winding reel supply means for the flexible line 68 extending to the charging electrode 66 which reel is connected to a source of sufficient high voltage potential through a switching means (not illustrated) which is operative to supply said voltage to the electrode at the proper instant during a cycle which will be described. The mold member 51 is mounted on a plurality of rods 58 in accordance with conventional molding apparatus construction, which rods are supported in sliding bearing by means of a plate 57 and are connected to an actuating device such as a hydraulic ram 59 for bringing the surface 54 of the mold into sealing engagement with the surface 63 of the other mold member 61 and in certain instances, for prepositioning mold member 51 with respect to the electrode 66 upon alignment of the latter with the cavity 52 thereof. Mold member 61 is shown supported on a stationary mount 63. Although not illustrated, the electrode means mounted on base 65 may also be shaped and operative to uniformly charge the surface of the cavity 62 of mold member 61 if it is desired to also selectively deposit material thereon by the means hereafter described. Notation 55 refers to passageways in the mold member 51 for flowing one or more heat transfer fluids which are supplied thereto and removed therefrom by means of multiple flexible conditions 56 connected to one or more sources of said fluid or fluids.

In FIG. 11, means for projecting a light pattern against the charged surface of the photoconducting material defining the mold cavity wall surface is mounted in a housing 76 supported at the end of a shaft 77 of a lineal actuator 78 which predeterminedly positions said housing in alignment with the mold cavity. The housing 76 preferably includes, in addition to a light source of sufficient intensity, the necessary optical projection components and a mask such as photographic film disposed so as to provide the requisite light pattern as one or more projected beams emitting therefrom which predeterminedly intersects the surface of the charged photoconductive material defining the molding surface of the mold cavity to be selectively discharged by said light. The operation of the light source in housing 76 is preferably controlled by the same programming means controlling positioning of the housing and the other operations occurring during a molding cycle. A flexible wire 76W extends from the light source in housing 76 to a power supply through a switch (not shown) which is controlled by said program control means.

After the photoconductive surface of the mold has been selectively discharged to define a charge pattern thereon, droplet or particulate material having a charge opposite to that of the charged areas of the mold surface is flowed or sprayed thereagainst by means such as that illustrated in FIG. 12 and the particles form in a pattern substantially defined by the charge pattern against the surface of the mold. The particulate spraying means illustrated in FIG. 12 includes a spray nozzle 79 secured to the end of a shaft 82 of a lineal actuator (not shown) of the type described which is controlled by the said program control means to project and preposition said nozzle in alignment with the molding cavity after the projection means 76 has been removed from the general vicinity thereof. Notation 80 refers to a flexible conduit extending from nozzle 79 through which particulate or atomizable liquid coating material is controllably flowed by valve means (not illustrated) which is also controlled by said programming means. Notation 81 refers to a flexible electrical cable extending to the spray head 79 which is connected to a source of high voltage potential and electrode means disposed within said spray head for properly charging the material sprayed therefrom against the mold so that the particles dispensed therefrom will be attracted to the charged areas of the mold surface. The operation of the apparatus is such that excess particulate material flows from the mold cavity or is deflected and expelled therefrom, a chute 83 is provided on shaft 82 for catching said material and means (not shown) are provided for recycling the material dropped into the chute 83 to the source thereof.

Although the means described for prepositioning the electrode 66, projector 76, and spray nozzle 79 of FIGS. 10 to 12 may be separately mounted at different locations adjacent the molding apparatus, a preferably arrangement is to mount all three on a common rotatable base as illustrated in FIG. 13. The mount 75 for the lineal actuators 70, 78 and 84 which have been described is shown as a circular plate supported on a shaft 75' which is predeterminedly rotated by any suitable servo means (not shown). Thus each of the devices 66, 76 and 79 are respectively positioned in alignment with the cavity or cavities of either or both mold members by control of rotation of shaft 75' to perform the functions described.

FIG. 14 illustrates a modified form of the hereinbefore described apparatus in which the surface charging electrode, light pattern projection means, and coating means are all provided on a common mount and are sequentially operated to perform the described functions. A single lineal actuator 85 is mounted adjacent the molding apparatus and has a shaft 86 mounting a fixture 87 at the end thereof on which fixture is mounted a corona discharge electrode 66', a projector 76' of the type described and a housing 79' containing means for flowing charged deposition material against the surface of the mold cavity. The shaft 86 of lineal actuator 85 is not only longitudinally movable but is shown provided with means for rotating same so as to permit prepositioning of the electrode 66' mounted at the rear of frame 87 and the housing 76' and 79' with respect to the mold cavity. A reversible gear motor 88 is mounted on the side wall of 85 and the shaft 89 thereof has a bevel gear secured thereto and engaging the teeth of the gear 87 operative to rotate shaft 86 without moving therewith as the latter moves longitudinally. Slotted coupling means between gear 87 and 86 may be utilized to maintain the gear in driving engagement with 86 as the latter moves in and out of the actuator 85. Notation 68 refers to a flexible cable containing a fluid conduit for the material to be dispensed from discharge means 79' and electrical wires extending to the electrode 66' and the light source within housing 76'. The cable 68 is shown secured to shaft 86 and is sufficiently flexible to permit full rotation and longitudinal movement of said shaft. Notation 68' refers to an extension of cable 68 extending to the said source of fluent deposition material and the control means for power for energizing the devices 66' and 76'.

The apparatus illustrated in FIG. 14 may simply include the lineal actuator 85 operative to project and retract the devices mounted at the end of its shaft and/or rotate same as described. However, the apparatus illustrated may also be operative to pivot or otherwise move in one or more additional modes to preposition the mold's preparation devices in precise alignment with the mold cavity with or without controlled movement of the mold cavity with respect thereto.

Device 79' may comprise a spray nozzle of the type described in FIG. 12 and/or other means for depositing mold coating material. For example 79' may comprise an electron beam generating gun including means for generating an intense electron beam and directing same against the surface of the mold cavity wall and means for introducing one or more materials into said beam, vaporizing said material and causing same to be carried along the beam and selectively deposited thereby against the mold cavity wall. Such an arrangement would eliminate the necessity of selectively charging areas of the mold wall cavity since the automatic deflection control and operation of the beam of the electron gun would suffice to effect the selective deposition of material in the mold cavity for the purposes hereinabove described.

In another form of the invention, the forces of magnetism may be employed for either selectively depositing a particulate material on a mold wall prior to molding or retaining a selectively deposited particulate material on a mold wall until molding is effected thereagainst or until said material is fixed and bonded to the wall by heating. Various paramagnetic particulate materials may be employed as the decorating or coating material sprayed or otherwise caused to flow and be retained against selectively magnetized areas of the mold wall. The particulate material may comprise various thermoplastic resins loaded with magnetic oxides, barium ferrite or other material rendering same paramagnetic whereby it will be affected by a magnetic field and will be retained against a magnet or material disposed in a magnetic field of sufficient intensity. A suitable magnetic thermoplastic material which may be utilized and may be magnetized whereby it will retain itself against unmagnetized paramagnetic material such as iron or steel or other materials such as aluminum, cobalt, nickel alloys is a polyvinyl chloride filled with barium ferrite and known commercially as Koroseal which is manufactured by the B. F. Goodrich Company. If magnetized particles of such a polymer are sprayed through a mask disposed against a surface such as the surface of the mold wall cavity which is made of paramagnetic steel, the particles, will be magnetically attracted thereto in the shape of the opening or openings in the mask. The particles may be melted in situ after removal of the mask or retained in particulate form magnetically held against the mold wall during admission of molding material to the mold. If the mold wall or the hereinabove described mold liner is either selectively magnetized along predetermined areas thereof it is made of a composite of magnetic and non-magnetic materials defining the molding cavity wall, the said paramagnetic coating particulate material may be flowed or sprayed against a larger area of the mold wall than that on which it is desired to deposit and retain particles with the result that only those areas of the mold wall which are magnets or are magnetized will magnetically attract and retain particulate material, whereas particulate material disposed against other areas of the mold cavity wall will fall off or may be easily removed while air-blown against the mold cavity wall prior to molding.

In a particular form of magnetic mold wall operative to retain paramagnetic decorating material, an insert is provided in the wall of the mold made of a material capable of being permanently magnetized. One or more cavities in the outer surface of the insert define the contour of the decorating material to be applied to the molded article. Magnetic thermoplastic particles as described are flowed against the magnetic insert and into the cavities therein to fill said cavities. Excess particles attracted to the other portions of the insert are removed therefrom by air or mechanical means such as a brush. The particulate material is melted in the cavity in the insert or retained in particulate form until molding material is admitted to the mold operative to either melt and fuse with the particulate material or fuse same to the surface of the molding upon solidification of the molding material.

As stated, the apparatus hereinabove described preferably includes, a single variable programming device such as a multi-circuit timer which is manually or automatically reset at the end of each cycle and is operative to sequentially control such operations as movement of one or more mold sections to open and close against each other and to become prepositioned with respect to the described mold processing apparatus; movement of each mold processing device into working relationship with the mold cavity; operation of the processing device; retraction of the process device to clear the mold cavity; temperature of the mold; and the controlled flow of all materials including the mold coating material, molding material and heat transfer fluid or fluids. Such programming device is preferably of the type which may be adjusted or varied without difficulty to provide a decorating and molding cycle for fabricating many different articles. In a more spohisticated form of the invention, such a variable program control means may comprise means for reading a recorded or punched tape or card, disc or drum containing command control signals which are either generated in sequence per se or in accordance with feedback signals generated by limit switches and/or sensing devices operative to sense variables such as movements of components, material flow rate, depth or coating, molding pressures, etc.

Controls for the various servo devices (i.e. solenoids which control valves and motors driving mold members, pumps, valves and the like) may be of the pulse activated bi-stable type or the infinitely variable type controlled by variable analog type control signals which are generated by the program controller as show in my Patent Re. 25,570. Pulse activated controls may be used to start, stop and reverse motors or project or retract solenoids when pulsed by signals generated by a multi-circuit timer or the like.

In addition to providing means for disposing decorative material against the surface of a molded article as described, the apparatus and method may be utilized to provide materials other than decorative against the surface of a molded article for serving various purposes. For example, materials providing better or different characteristics than the molding material may be electrostatically adhered to one or more selected areas of the wall or walls of a mold cavity as described to abrade, provide better wear, lubricate, provide a particular rough or smooth finish, conduct electricity, insulate, provide a porous or non-porous skin or perform some other function.

For providing a better wearing surface, the particulate material may comprise a plastic such as a polyamide. For providing a lubricated surface, said particulate material may comprise molybdenum disulfide or plastic filled therewith. Various conductive plastics, metals or compounds may be selectively disposed against the mold wall as described to form conducting areas or circuits on the surface of the molded part. Abrasive particles of such compounds of tungsten carbide, silicon carbide, aluminum oxide or the like may also be so disposed to become partly embedded in the surface strata of the molded part.

A printing or selective article decoration process derivable from use of the hereinbefore described apparatus comprises selectively depositing thermoplastic particulate material on the surface of an article or sheet of paper as discrete layers of said particulate material in contours representing indicia or other decorations, rendering said deposited particulate material semi-molten or molten and while still in a semi-molten or molten condition, transferring same from the first surface against a second surface such as a sheet of paper or article and bonding same in its original shape to the second surface. The first surface on which deposition is made may comprise a drum or printing plate and any of the means of FIGS. 1 to 13 may be employed to deposit and render the deposited particles molten or semi-molten.

If the apparatus hereinbefore presented or modifications thereof is utilized for decorating or labeling articles formed by blow molding a parison or other shape between mold sections closed thereagainst, then portions of the parison may be selectively coated or decorated as or immediately after it is formed and prior to blowing thereof to provide part or all of the surface decoration for the article molded therefrom. Such decoration or decorations may be provided on the inside and/or outside surface of the parison by a mask and spray means disposed inside and/or outside the parison and operative to selectively coat atomized droplets or particulate material against the surface of the parison which immediately bond thereto. The particles of thermoplastic coating material may be rendered molten or semi-molten on the areas of the parison on which they are deposited or sprayed by the heat of the parison as it extrudes and/or other heating means as described including means disposed on the spray head, radiant heating means inside and/or outside the parison, dielectric heating means surrounding the parison or disposed on the mandrel or beam heating means as described including laser or electron beam generating means mounted on the extrusion head mandrel or exterior thereof. A stationary of movable mask which is movable at the same speed as the parison may be mounted on the mandrel which forms the inside surface of the parison at the end thereof which extends beyond the end of the die as may a spray head for particulate or atomized particles or droplets of coating material which is operative to selectively coat the inside surface of the parison prior to blowing same to shape in the mold. By eliminating the mask, the coating liquid or particulate material may be continuously sprayed from the mandrel mounted nozzle after being delivered from a source thereof through a passageway extending through the mandrel so as to provide a uniform coating of material on the entire inside surface of the parison. If the coating is sufficiently thick and remains semi-molten, molten or liquid during blowing or is capable of being stretched, it will remain contiguous during blowing and may be used as a coating along the entire inside surface of the blown article for imparting characteristics to the blown article not rendered by the extruded parison material. If the parison material has a tendency, for example to be porous or water absorbing, the coating material may comprise, for example a thermoplastic or thermosetting resin such as an epoxy, phenolic or urea formaldehyde, polyamide, polycarbonate, phenoxy or other resin which will render the inside of the article (such as a bottle) non-absorbing and non-porous. Thermoplastic coatings so applied may set and integrally bond to the blow molding material which may be polyethylene or other suitable resin and thermosetting resins may air dry or otherwise set thereafter on the inside of the blown article. In still another form, the coating material may be applied as a spray to the inside of the blown article while still in the mold by spraying means mounted on the mandrel of the extruder inserted into the neck of the blown bottle or through a separate injector such as the blowing needle sometimes inserted into the wall of the parison and used to blow same into the mold. The mandrel inserted into the open parison or blown article, may also mount an electrode or electrodes such as an electron beam generating means, glow discharge electrode or other means operative to generate an electron beam, electrostatic, ionic or other electrical field within the parison or blown article with the mold or an electrode disposed outside the parison serving as a ground or cooperating electrode to create the electrical discharge phenomenon. Material such as a monomer in gas, vapor, atomized or particulate form or vaporized metal may be introduced into the volume defined by the parison or blown article from a source of said material or electrode mounted on the extrusion mandrel or derived from a source connected to a passageway through the mandrel. If a monomer is so deposited against the inside surface of the parison or blown article, it may be polymerized in situ against said surface by the action of the glow discharge means. If vaporized metal is so deposited, it may be protected by depositing thereover or therewith a film or coating of thermoplastic or thermosetting resin or monomer dispensed from the end of the mandrel as described and, in the case of the monomer, polymerized in situ against the inside surface of the metal or other material deposited therebefore. If a bottle is so blow molded and internally coated before removal from the mold, the coating action may be followed by a filling action in which a product is introduced through another passageway in the mandrel prior to removal therefrom.

Referring once more to the form of the invention illustrated in FIG. 6 wherein decoration material is first deposited onto selective areas of a form 31 to provide layer formations 27″ on the surface 32 thereof and is thereafter transferred to the surface 13 of the mold cavity wall, it is noted that the surface 32 of the transfer form 31 need not conform to the surface 13 to which the material formations 27″ are to be transferred. Only those portions of surface 32 which contain the decorating formations 27″ need conform to the surface 13 when the form 31 is moved adjacent surface 13 to effect the selective coating or decoration thereof. Accordingly, the surface portions of 31 against which material formations 27″ are deposited may be raised formations surrounded by depressed surface portions of surface 32. In other words, the surface 32 may be formed by machining, etching or molding similar to that of a printing cut. Providing such a structure will permit transfer of surface decorating material such as 27″ coating predetermined surface areas as defined by the raised portions of the surface 32 in one or more of a number of manners. In a first procedure, the form 31 is charged electrostatically or by direct current means applied continuously thereto to a first polarity and the particulate material is charged to an opposite polarity thereto. Flowing such material as described against the entire surface 32 will result in covering said surface therewith but only that material disposed on the raised portions of said surface will engage the surface (13) since the material disposed against the recessed portions of surface 32 is disposed away from surface 13. Transfer of the material 27″ on the raised portions of member 32 may be effected by electrostatic means (i.e. where surface 13 is charged so as to remove the particles comprising formations 27″ from the raised portions on which they are disposed); by magnetic attraction means (if the particles are made of a paramagnetic plastic such as vinyl containing barium ferrite and are either magnetized or are attracted to the surface 13 of the magnetized mold wall); by heating the surface 13 as described and rendering the particulate material of formations 27″ semi-molten and tacky such that it adheres to 13; or by coating the surface 13 with a tacky adhesive or plastic rendered semi-molten thereon and operative to adhere all if not part of the particles of formations 27″. The described procedures may be applied, in addition to decorating articles as described, for printing sheet material of flat or irregular contour wherein member 31 may be shaped as a printing plate or die with raised cut formations in the surface 32 thereof. The paper, plastic, metal or glass sheet material may be heated to melt the particles of formations 27″ or a drum or platen disposed therebeneath may be so heated while the form 31 may be water cooled through internal passageway flow of coolant to prevent the particulate material disposed on the recessed portions of the platen 31 from melting. Thermoplastic resin coated sheet material may have its coating rendered semi-molten by passing same over a heated platen or drum or by dielectric heating means to bond the particles of formation 27″ thereto.

If relatively thick formations are desired on the surface 13 of the mold or a sheet material, particulate material may be removed from the raised portions (defining formations 32) by means of a brush wiping same or air blown thereacross while the particulate material in the recesses remains. Heating transfer member 31 thereafter will result in rendering the particulate material in said recesses semi-molten or molten and, if it is provided to a depth whereby when heated it is at the level of the surfaces of the raised formations of the cut, then it may be engaged against and bonded to the surface 13 of the mold or a sheet material. If the member containing the surface (13) against which it is desired to transfer predeterminedly shaped formations 27″ while semi-molten, is itself thermoplastic or resilient, then it may be deformed by the raised portions of the heated transfer member to compressively engage the molten or semi-molten formations contained within the recesses of the printing member 31. If the particulate material filling the recesses in a transfer member such as 31 is a heat expandable plastic such as polystyrene containing a blowing agent, it may be expanded while the transfer member (31) is disposed against the surface (13) of the mold or sheet against which it is desired to mold or secure the expanded plastic and while either the transfer member or the member to which it is to be secured are heated to effect said expansion and formation of the plastic. The surface of the article, sheet or mold to receive and retain the expanded plastic decorations may also be coated with a thermoplastic material or adhesive operative to bond the expanded plastic formations thereto so that the form 31, when removed from the vicinity of the member against which it is compressed will do so without retaining the expanded plastic formation in its recesses. A suitable self-expanding plastic commercially available is Dylite expandable polystyrene which is available in small pellet or particulate form and contains from 5% to 8% of a blowing agent. In using such material, the raised portions of the form 31 preferably engage the surface of the mold, article or sheet adapted to receive and retain the expanded formations and define essentially a close mold or mold cavities therewith and the depressed formations in form 31. Heat transferred to the form contained beads either from the form and/or the member against which the form is compressed may be operative to expand the beads and bond same into molded formations defined by the shape of the cavities and the surface against which the form in which the cavities are provided is compressed. Formations of expanded plastic provided on the surface of a mold wall may be made integral with further expandable plastic formed thereagainst thereafter in the mold.

In still another form of the invention, thermoplastic material in particulate form may be disposed as a layer on the surface of an article, mold or sheet material and held thereon by electrostatic means, magnetic means or gravity. Thereafter, a heated die having raised and recessed portions such as an embossing die or printing cut may have its raised portions brought to bear against the particulate material on said surface to heat and melt those particles aligned with the raised portions thereof. Thereafter the melted particles may form contiguous formations which either remain on the surface the particles are originally applied to or are transferred to the raised portions of the cut or die. The non-melted particles on adjacent areas may be removed thereafter by air blown thereagainst and/or gravity means.

I claim:

1. Apparatus for molding composite articles comprising:
   (a) a first mold member,
   (b) a second mold member movable from a retracted position into engagement with said first mold member,
   (c) facing portions of the walls of said first and second mold members defining a cavity when said mold members are assembled in which cavity an article may be shaped,
   (d) apparatus for depositing a fluent material against a selected portion of the wall of at least one of said mold members defining said cavity, means disposing molding material in said mold,
   (e) said depositing apparatus including a spray head and means for flowing fluent material therefrom,
   (f) a mount for said spray head,
   (g) means for moving said mount to align said spray head with said first mold member,
   (h) means for moving said second mold member to retract from and close against said first mold member,
   (i) control means for said deposition apparatus and each of said moving means, and
   (j) cycle control means operative to control said mold moving means to separate said second mold member from said first mold member, move said mount for said spray head to align said spray head with said material to deposit against a selected area of the surface of the mold cavity wall, control the introduction of molding material into said mold so as to be disposing same against said mold wall including the area covered by said deposited material to form a composite article of the two materials upon solidification, said control means being operative to control the opening of the mold for removal of the composite article from said mold.

2. A method of decorating a molded article comprising the steps of:
   (a) providing a mold having a cavity with a wall defining at least part of the shape of an article to be molded therein;
   (b) selectively charging portions of the wall of said cavity with static electricity to form charged wall portions having a charge thereon,
   (c) oppositely charging particles of a decorating material to the charge of said charged portions of said wall,
   (d) applying said charged particles to said wall which particles become attracted to said charged portions of the surface and repelled from adjacent areas, (e) and causing a material to be molded to conform to the surface of said cavity wall and simultaneously adhere to the material first disposed thereagainst to provide a said decorating material on selected areas of the surface of the molded article.

3. Method in accordance with claim 2 in which the particles comprise a ceramic material having a first melting point and said molding material is metal in a molten state having a melting point other than that of said particle material.

4. Method of molding articles comprising:

(a) disposing a decorative material against a selected area of the wall of a mold cavity in which an article is to be molded, (b) bonding said decorative material in place against said selected area of said mold wall, (c) disposing molding material in said mold cavity and said decorative material and solidifying said molding material in situ against said mold wall and decorative material to retentively bond said molding material to said decorative material, the bond between said molding material and said decorative material being greater than that between said decorative material and the wall of said mold, and (d) removing said article from said mold with said decorative material forming an integral part of the surface thereof.

5. A method of molding articles comprising:

(a) disposing a decorative material against a selected area of the wall of a mold cavity and heating same to form a molten coating on said selected area, (b) solidifying said molten coating in situ on said mold cavity wall and causing same to become bonded thereto, (c) disposing a molding material in said mold cavity and said decorative material and solidifying said molding material in situ against said mold wall and decorative material to retentively bond said molding material to said decorative material, the bond between said molding material and said decorative material being greater than that between said decorative material and the wall of said mold, and (d) removing said article from said mold with said decorative material forming an integral part of the surface thereof.

6. Apparatus for decorating articles of manufacture comprising in combination with a form having a working surface contoured to substantially the shape of at least a portion of the surface of an article, means for electrostatically charging a predetermined portion of said working surface with a first polarity, a supply of decorative particulate material, means for electrostatically charging said particulate material with a second polarity, means for flowing said particulate material against said working surface and causing it to form as a layer on the charged area of said working surface, means for providing an article against said working surface substantially the contour of said surface, means for transferring said material from said working surface to the surface of said article to form a layer on a predetermined area thereof, and means for bonding said decorative material to said predetermined area of said article.

7. Apparatus in accordance with claim 6, said means for transferring and bonding said particulate material to said article comprising means for melting said particulate material after it becomes disposed against said working surface of said form to provide a coating thereof on a predetermined area of said working surface, said article having greater attraction to said material whereby it will cause said coating to transfer from said working surface to the surface of said article, and means for bonding said coating to the surface of said article.

8. Method of decorating articles comprising:

(a) providing an article with an irregular surface to be decorated, (b) providing a transfer member having a portion of its surface shaped to the contour of at least a portion of the surface of said article, (c) providing selected areas of the surface of said transfer member charged to a first polarity, (d) flowing finely divided decorative material against the surface of said transfer member which particles are charged to a polarity opposite to that of the charge of the selected areas of said transfer member whereby to cause said decorative material to become attracted to said charged areas, (e) bringing the surface of said transfer member containing said charged particles proximate to the surface of said article of similar shape, (f) transferring decorative material therefrom against said selected areas of said article to substantially contiguously coat said selected areas, (g) and bonding said decorative material to said selected areas of the surface of said article.

9. A method of molding comprising:

(a) prepositioning a mold member and a device operative to generate an intense electron beam, (b) controlling said device to generate an intense electron beam and directing said beam against a predetermined area of the wall of the cavity of said mold member, (c) disposing a first material in said intense beam and causing said material to be deposited thereby against said predetermined area of said cavity wall of said mold member to form a coating thereon of predetermined thickness, (d) thereafter disposing a second material in said mold and forming said second material to shape an article thereof against the wall of said cavity and the material deposited thereon by said beam, (e) bonding said first material to the surface of said article and removing said article from the mold with said first material forming part of its surface.

10. Method of molding composite articles comprising:

(a) predeterminedly disposing a first article against the surface of a mold wall with at least a portion of said first article disposed within and occupying part of the mold cavity, (b) bonding said first article to said mold wall by directing an intense radiation beam thereagainst to render a small portion of the material thereof molten and to cause same to adhere to said mold wall surface, (c) admitting a molding material to said mold cavity and molding same in situ against the wall thereof and said first article, (d) soldifying said molding material in said cavity and causing said first article to become attached to said molding material to define a composite article, and (e) removing said composite article from said mold by severing the bond between said first article and said mold wall.

11. A method of decorating an article of manufacture comprising the steps of:

(a) prepositioning said article relative to a spraying device adapted to spray finely divided material, as droplets or particles, (b) disposing a mask having openings therein through which to spray said material against a surface of said article between the article and said spraying device, (c) charging said finely divided droplets to a first polarity, (d) charging said mask the same electrical polarity as said material such as to repel said particles from said mask, (e) and flowing said finely divided material from said spraying device in the direction of the openings in said mask and causing said material to flow through said openings without impinging on said mask.

12. A method of decorating an article with a thermoplastic material comprising the steps of providing said thermoplastic material in particle form, flowing said thermoplastic material over a decoration means including a die having a plurality of raised portions, heating said raised portions of said die whereby the particles of said thermoplastic material upon contact therewith will melt and form a coating on the surface of the raised portions of the die, retaining said die in the flow of said particles until a layer of predetermined thickness of said thermoplastic material has deposited on said raised portions, and applying said raised portions of said die to the surface of an article to be decorated, said article being made of a material having the characteristics of retaining at least part of the molten thermoplastic material deposited on the raised portions of the die in substantially the area contacted thereby.

13. A method of decorating an article of manufacture with plastic comprising the steps of providing said plastic in a particlized or powdered state, applying a quantity of said particlized plastic to a predetermined area of a surface of said article to be decorated, providing a die having a surface containing raised portions of predetermined shape, heating said surface of said die to a predetermined temperature above the melting point of said particlized plastic, impressing said heated raised portions of said die against the particles of plastic on said surface of said article to melt only predetermined particles covering substantially the areas defined by the raised portions of said die and to cause bonding of the melted plastic to the surface of said article, and thereafter removing the excess plastic particles which have not melted.

14. Apparatus for molding comprising:

(a) a mold having a cavity with a wall portion operative to define the shape of an article, (b) means for providing a charge pattern on the wall of the mold cavity covering selected areas thereof, at a first polarity, (c) means for flowing a first fluent material in particulate form against selected areas of the mold cavity wall as determined by the charge pattern provided on the mold wall, (d) means for controlling flow of said first material to deposit a predetermined amount thereof onto said charged areas of said mold wall, (e) means maintaining said first material on said wall and flowing a second material into said mold cavity, (f) means soldifying said second material in said mold cavity against said first material coating said wall and the portions of the wall thereof not containing said first material, (g) said second material being operative upon solidifying a retentively bond said first material thereto and to form an article having said first material as an integral portion of its surface.

15. Apparatus for molding comprising:

(a) an injection mold having a cavity with a wall defining the shape of an article to be molded therein, (b) electrostatic deposition means for transferring a fluent material from adjacent the mold cavity wall and selectively depositing said material as a coating onto a selected area of said mold cavity wall, (c) means for disposing molding material in said mold cavity against both the wall thereof and the coating material disposed on said wall, and (d) means for bonding said first and molding materials upon shaping said molding material in said mold to provide a molded article having a portion of its surface defined by said first material.

16. An apparatus for molding, in accordance with claim 1, whereby said apparatus for selectively depositing a fluent molding material against a selected portion of said wall comprises a mask disposed between said spray head and said mold and means for moving said mask into and out of operative relationship with the mold prior to and after flowing material from said spray head.

*17. A method of decorating a substrate with a thermoplastic material comprising the steps of providing said thermoplastic material in a particulate state, applying a quantity of said particulate thermoplastic material to said substrate to form a uniform layer thereof on a predetermined area of said substrate, non-uniformly applying heat by generating and directing radiant energy in a selected pattern from above said substrate so as to selectively heat said substrate and selected particles of said particulate material, rendering said selective heated particles of thermoplastic particulate material molten to the exclusion of the other particles of said particulate material forming said uniform layer on said predetermined area of said substrate, cooling and fusing the molten particles to selected areas of said substrate and thereafter removing the excess unmelted thermoplastic particles from said substrate and leaving said substrate coated with a solid thermoplastic material on said selected areas thereof.*

*18. A method in accordance with claim 17 including retaining the particles forming said uniform layer of thermoplastic material against the surface of said substrate by electrostatically attracting said particles to said substrate.*

*19. A method in accordance with claim 17 wherein the thermoplastic particles which are not rendered molten during the selective heating step are removed from the surface of the substrate by gravity.*

*20. A method in accordance with claim 17 wherein the thermoplastic particles which are not rendered molten during the selective heating step are removed from the surface of the substrate by air blown thereagainst.*

References Cited

The following references, cited by the Examiner, are of record in the patented file of this patent or the original patent.

UNITED STATES PATENTS

| | | | |
|---|---|---|---|
| 3,324,508 | 6/1967 | Dickinson | 264—132 |
| 2,451,934 | 10/1948 | Evans | 264—24 |
| 3,207,822 | 9/1965 | Makowski | 264—275 |
| 3,108,850 | 10/1963 | Brandt | 264—275 |
| 3,000,079 | 9/1961 | Howell et al. | 18—36 |
| 3,085,295 | 4/1963 | Pizzino et al. | 18—5 |
| 3,368,014 | 2/1968 | Tijunelis | 264—132 |
| 2,236,582 | 4/1941 | Schuetz | 264—131 |
| 2,677,622 | 5/1954 | Schouteden | 117—21 |
| 2,920,679 | 1/1960 | Sittel | 264—24 |
| 2,963,748 | 12/1960 | Young | 264—131 |
| 3,301,925 | 1/1967 | Engel | 264—310 |
| 3,491,170 | 1/1970 | Roe, Jr. | 264—24 |
| 3,226,227 | 12/1965 | Wolff | 117—17.5 |
| 3,231,374 | 1/1966 | Sciambi | 117—17.5 |
| 3,270,101 | 8/1966 | Jardine et al. | 264—275 |
| 3,284,224 | 11/1966 | Lehmann | 117—17.5 |
| 2,236,582 | 4/1941 | Schuetz | 264—131 |
| 2,677,622 | 5/1954 | Schouteden | 117—21 |
| 2,920,679 | 1/1960 | Sittel | 264—24 |
| 2,963,748 | 12/1960 | Young | 264—131 |
| 3,278,656 | 10/1966 | Dicks et al. | 264—24 |
| 3,301,925 | 1/1967 | Engel | 264—310 |
| 3,491,170 | 1/1970 | Roe, Jr. | 264—24 |

JEFFERY R. THURLOW, Primary Examiner

U.S. Cl. X.R.

117—17.5, 21; 264—132, 255; 425—3